310-12 SR

F213A XR 3,576,454

United States Patent

[11] 3,576,454

[72] Inventors Laurence R. Beach, Jr.
Boulder, Colo.;
Robert J. Black, Los Gatos, Calif.

[21] Appl. No. 716,968
[22] Filed Mar. 28, 1968
[45] Patented Apr. 27, 1971
[73] Assignee International Business Machines Corporation
Armonk, N.Y.

[54] DATA STORAGE ACCESSING MECHANISM WITH MOVING COIL MOTOR
3 Claims, 3 Drawing Figs.

[52] U.S. Cl. .......... 310/16, 340/174.1
[51] Int. Cl. .......... H02k 1/20, G11b 21/08
[50] Field of Search .......... 340/174.1 (C); 310/12—14, 16; 179/115.5

[56] References Cited

UNITED STATES PATENTS

| | | | |
|---|---|---|---|
| 2,717,319 | 9/1955 | Bundy .......... | 310/16 |
| 3,156,837 | 11/1964 | Weller et al. .......... | 310/16 |
| 3,346,748 | 10/1967 | McNair .......... | 310/16 |
| 3,422,293 | 1/1969 | Booth .......... | 310/16 |
| 3,130,331 | 4/1964 | Jallen et al. .......... | 340/174.1 |
| 3,260,870 | 7/1966 | Beach et al. .......... | 310/14 |

OTHER REFERENCES

Smeltzer, N. G., " LINEAR ACTUATOR," IBM Technical Disclosure Bulletin, Vol. 4, No. 3, August 1961, p. 22

*Primary Examiner*—Bernard Konick
*Assistant Examiner*—Vincent P. Canney
*Attorneys*—Hanifin and Jancin and John H. Holcombe

ABSTRACT: Apparatus for moving transducers into or out of engagement with a recording medium and for adjusting the position of the transducer laterally with respect to tracks to thereby selectively access those tracks. The apparatus includes a DC linear electric motor employing external magnets. The specific arrangement comprises a plurality of permanent magnets arranged on either side of, and parallel to, a magnetically permeable center pole piece. The rear of the magnets and the center pole piece are connected by a magnetically permeable plate. A front magnetically permeable plate interconnects the magnets at the other end and forms a gap surrounding the center pole piece. A hollow coil is mounted on a carriage and is slidably inserted through the gap and over the center pole piece. The transducers are then mounted on the carriage. The arrangement focuses the magnetic flux across the gap whereby electrical energization of the coil causes the coil to be moved in one direction or the other along the center pole piece, thereby moving the carriage and the transducers longitudinally, and hence, laterally with respect to tracks on the recording medium.

Patented April 27, 1971 3,576,454

2 Sheets-Sheet 1

INVENTORS
LAURENCE R BEACH, JR.
ROBERT J. BLACK
BY John H. Holcombe
ATTORNEY

DATA STORAGE ACCESSING MECHANISM WITH MOVING COIL MOTOR

Background of the Invention

1. Field of the Invention

The invention relates to stored-data recording and playback apparatus and more particularly to apparatus employing relative movement between a recording medium and a transducer.

2. Description of the Prior Art

As data storage systems have developed, each improvement thereto has been directed to optimizing the compromise between increasing the areal density of data, lowering the access time required to find the desired data, and cost reduction. As a result of this development, most data storage devices employ a recording medium comprising a surface having parallel linear strings of data recorded thereon. The linear strings of data are called "tracks". This data is read or played back by means of one or more transducers jointly with means for causing relative movement between the transducer or transducers and the recording medium. This relative movement is generally arranged such that a transducer follows along a corresponding track, recording or reading that track.

Data storage systems employed as part of data processing apparatus require high speed accessing of the various tracks. Two basic philosophies are available. First, a separate transducer may be supplied for each track so that switching between tracks may be done electronically. Second, apparatus may be provided to move a single transducer from track to track of the recording medium. The high cost of individual transducers makes the first alternative prohibitive in the majority of applications.

A substantial degree of effort has therefor been applied to the development of high speed mechanisms for moving a transducer laterally from track to track and for then accurately positioning the transducer with respect to the selected track.

In the event that a large number of heads were to be positioned simultaneously, as in a disc file having a large number of discs and one transducer for each disc surface, hydraulic positioning systems are employed by the prior art. The hydraulic positioning system includes a continuously operating hydraulic pump, a piston for transducer positioning, and a valve system for controlling the flow of fluid from the pump and thereby control the operation of the piston. The hydraulic system, however, proved relatively complex and costly for attaining sufficient speed of operation in moving a transducer from track to track. For a smaller system employing only one or two transducers so that the system weight is substantially reduced, ring-type electric motors have been employed for positioning. The electric motors operated satisfactorily in this application, but would become bulky and inefficient in attempting to position heavier loads with the same speed and accuracy. The bulk is necessary to provide sufficient magnetic flux and operation of the coil at the high power required for fast access causes excessive heat to be generated.

SUMMARY

An object of the present invention is to provide an electric motor capable of driving a load including a plurality of transducers to attain high speed track to track accessing of the transducers.

Briefly, the invention comprises apparatus for converting DC electrical energy into linear mechanical motion for positioning a transducer laterally with respect to tracks of a recording medium. The apparatus includes an elongated pole piece of magnetically permeable material, and a plurality of magnet means aligned to be of like polarity and essentially parallel to, but separate from, the elongated pole piece. A rear pole piece connects one pole of each of the magnet means to one end of the elongated pole piece, and a front pole piece interconnects the other pole of each of the magnet means and forms an air gap surrounding the elongated pole piece at the other end thereof, the air gap being of substantially uniform dimension. This arrangement causes magnetic flux generated by the plurality of magnet means to permeate the rear pole piece, the elongated pole piece and the front pole piece to thereby extend lines of flux through the air gap radially with respect to the axis of the elongated pole piece. A carriage is provided to support the transducers in a predetermined relation with respect to the recording medium and is adapted to be capable of movement longitudinally with respect to the axis of the elongated pole piece. An electric coil is supported by the carriage and is positioned about the elongated pole piece and arranged to move axially along the elongated pole piece and through the gap. Therefore, application of a DC electric current through the coil generates a force at the air gap with respect to the lines of flux tending to move the coil in the axial direction, so as to move the carriage and, hence, the transducers in the axial direction.

The invention thus provides a plurality of magnets and concentrates the magnetic flux generated by the magnets across a relatively small air gap to provide a powerful magnetic field thereat. The resultant motor is of high efficiency with only relatively insignificant leakage of magnetic flux. In addition, the electric coil is exposed to the outside atmosphere over its entire outer surface, thereby providing substantial cooling to allow continuous operation at high electrical energies.

Description of the Preferred Embodiment

As discussed above the evolution of data storage devices has resulted in the popularization of those devices which employ a storage medium having a surface upon which are recorded a plurality of parallel tracks. Examples of such devices include tape drives, drums, disc files and strip files. These systems employ various embodiments of apparatus including one or more transducers, a storage medium having a magnetizable surface, and means for causing relative movement between the transducer or transducers and the storage medium to thereby read or write the linear strings of data comprising the tracks.

Figure 1:
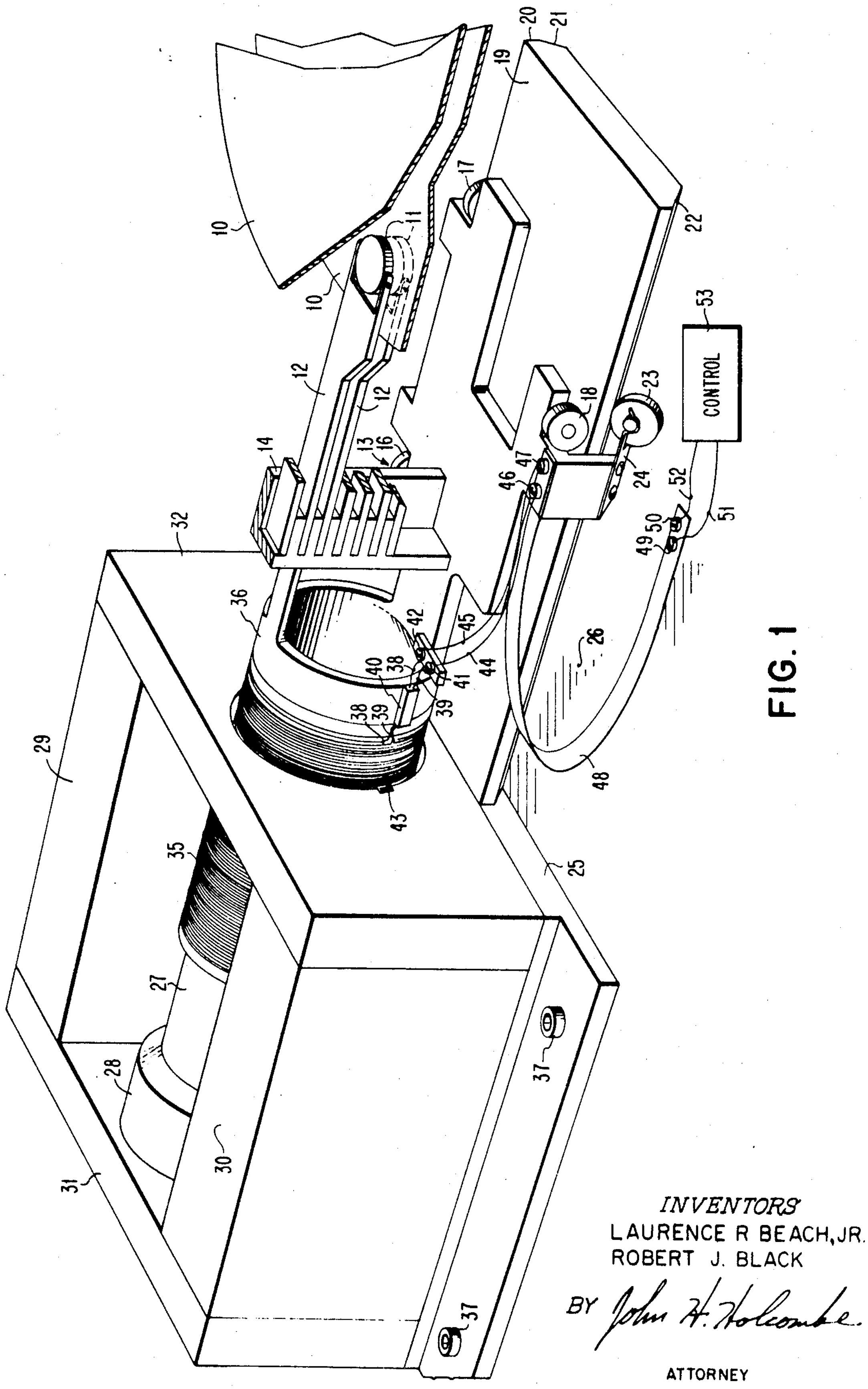
FIG. 1 is a perspective illustration of the accessing mechanism constructed in accordance with the present invention.

Referring to FIG. 1, the subject invention is shown in use with a plurality of discs 10. However, the subject invention may be utilized with any of the above systems employing relative motion between a transducer and the recording medium to read or write the stored data.

In FIG. 1, the discs 10 have a magnetizable coating on each surface and data may be stored or played back therefrom by means of transducers 11. The transducers cooperate with the magnetizable surface to convert electrical energy into a magnetic field and thereby permeate the magnetizable surface to record thereon, or to detect the magnetic fields emanating from the previously recorded data and convert the detected magnetic fields into electric signals. The transducers are mounted on arm assemblies 12 which, in turn, are mounted on a carriage assembly 13.

The specific transducers 11, arm assemblies 12, or means for mounting the arm assemblies on the carriage assembly comprise no part of the present invention. Hence, any known means may be employed so long as it may be compatible with the present invention.

The carriage assembly 13 includes a vertical portion 14 which is shown partially cut away. The vertical portion supports a plurality of the arm assemblies and transducers, only two of which are shown in their entirety. In the more common arrangements presently in use, either 10 transducer and arm assemblies cooperate with five discs or 20 transducer and arm assemblies cooperate with 10 discs. The invention, however, is intended to be employable with any suitable number of transducer and arm assemblies or with assemblies employing a plurality of transducers with each or a single arm assembly 12.

The vertical portion 14 of the carriage assembly is fixedly mounted with respect to a base portion 15 of the carriage. The base portion 15 has three precision rollers 16—18 rotatably attached thereto. The rollers bear on a surface 19 of a base plate 20. The surface 19 is precisely positioned with respect to the vertical location of the discs 10 and is maintained exactly parallel to the discs. Hence, the precise structure of the carriage assembly 13 and base plate 20 assures that the transducers 11 will be precisely oriented with respect to the surfaces of the discs 10.

The rollers 16—18 are held against the surface 19 of base plate 20 by means of rollers which ride on tapered surfaces 21 and 22 of the base plate. A roller 23 is held against the tapered surface 22 by means of a spring 24 attached to the carriage assembly 13. The spring is adjusted so as to be maintained slightly deformed to thereby force the roller 23 into engagement with the tapered surface 22. A similar roller and spring arrangement is provided on the opposite side of the carriage assembly 13 to engage tapered surface 21 of the base plate 20. The pressures exerted by these rollers force the rollers 16—18 into engagement with the surface 19 of the base plate 20 and thereby maintain the precise alignment described.

The magnet structure of the present invention is fixedly mounted with respect to base plate 20 and hence held in alignment therewith. The structure includes a base 25 for the magnet structure which merely supports the magnet structure in a fixed relationship. The base plate 20 for the carriage assembly 13 and the support 25 for the magnet structure are both supported by a common member 26.

Figure 2:
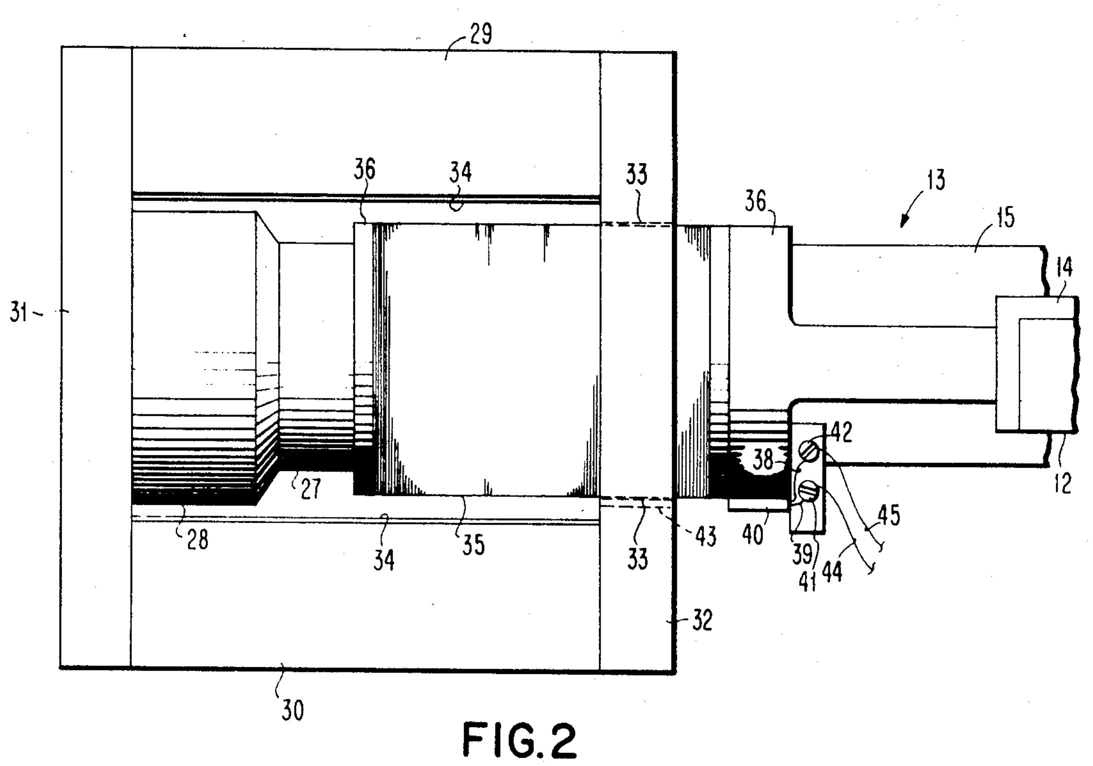
FIG. 2 is a plan view of the motor of FIG. 1.
Figure 3:
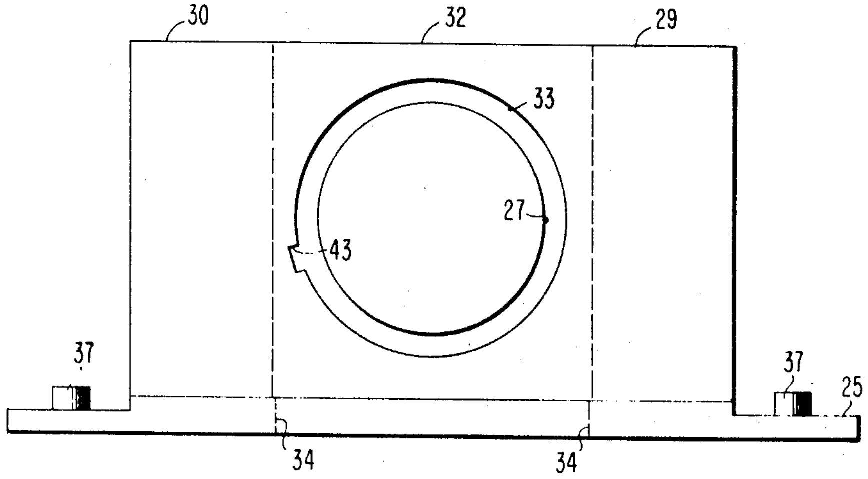
FIG. 3 is a frontal view of the magnet structure of the motor of FIG. 2.

The structural arrangement of the total magnet structure may be seen in more detail by additionally referring to FIGS. 2 and 3.

The magnet structure includes a pole piece 27 made of a magnetically permeable material, such as soft iron. In the example shown, the pole piece 27 is centrally located and is in the form of a cylinder having a base 28 of slightly larger diameter. The larger diameter is merely to increase the overall permeability of the central pole piece and is not necessary for operation. The particular cross-sectional shape and placement of the pole piece 27 is not intended to limit the present invention. However, the arrangement illustrated appears to be the best for most efficient operation.

Two permanent magnets 29 and 30 are arranged generally in parallel to the axis of cylindrical center pole piece 27. The polarities of the two permanent magnets are the same. As will be pointed out below, the permanent magnets are spaced apart from the cylindrical pole piece.

For convenience in the arrangement of the magnets, the permanent magnets shown in the illustrated example are of rectangular cross section. However, permanent magnets of any cross-sectional shape may be utilized with the invention as may electromagnets. As a matter purely of choice, the north pole of each of the permanent magnets is presumed to be the end closest to the carriage structure 13.

The south pole of each of the permanent magnets is connected to the base 28 of the cylindrical pole piece 27 by means of rear pole piece 31. The rear pole piece is constructed of magnetically permeable material, such as soft iron. Again, the particular shape of this pole piece is not important to the invention.

The north polarity ends of the permanent magnets 29 and 30 are interconnected by means of a front pole piece 32. The front pole piece is also constructed of magnetically permeable material, such as soft iron. A hole 33 is cut in the central pole piece of radius larger than the radius of central pole piece 27, thereby allowing the central pole piece to extend therethrough. The axes of the hole 33 and of central pole piece 27 are aligned to form a substantially uniform gap therebetween.

The central pole piece 27 is also arranged to extend slightly beyond the front of pole piece 32 for high efficiency.

Although not necessary to the invention, dimensional accuracy has been attained by making the center cylindrical pole piece 27, base 28 and rear pole piece 31 out of a common piece of material. In this way no alignment of separate pieces for bonding or attachment is required.

The magnet structure is assembled by placing the pieces together, as shown, on base 25, aligning the cylindrical center pole piece 27 with respect to hole 33 in front pole piece 32, and bonding the assembly to base plate 25. The structural elements comprising magnets 29 and 30 and pole pieces 31 and 32, are held together primarily by the magnetic force generated by the permanent magnets. The maintenance of alignment accuracies, however, are assured by the bonding of the pieces to base plate 25. The base plate 25 and the support member 26 both have an opening 34 cut therein roughly corresponding to the interior walls of the permanent magnets 29, 30 and pole pieces 31, 32. The opening 34 both prevents leakage of magnetic flux thereacross and provides an opening for air cooling as will be described hereinafter.

An electric coil 35 is wound on a bobbin 36 in a nearly uniform manner over the length of the bobbin. The bobbin is of tubular shape, having an interior diameter slightly greater than that of cylindrical pole piece 27. The bobbin is thus adapted to fit on the cylindrical pole piece and, when axially aligned therewith, to be out of contact with the cylindrical pole piece. Likewise, the outer diameter of bobbin 36 and the thickness of the winding of coil 35 are arranged to provide an overall outside diameter slightly less than the inner diameter of hole 33 so that, when axially aligned therewith, no frictional contact occurs therebetween.

The bobbin 36 in the example shown is constructed from a nonmagnetic material such as cast aluminum. The bobbin 36 is fixedly mounted with respect to carriage assembly 13. In the example shown, this mounting is attained in that the bobbin 36, vertical portion 14 and base portion 15 of carriage assembly 13 comprise a common aluminum casting. By virtue of the common casting, the accurate alignment of the bobbin 36 with the carriage assembly is assured.

As discussed above, the support plate 25 for the magnet assembly is placed on support surface 26 so that the assembly is accurately aligned with respect to the carriage base plate 20. The magnet assembly is then firmly mounted in place by means of bolts 37.

As a result, subsequent mounting of the carriage assembly 13 on carriage base 20 establishes accurate alignment of bobbin 36 with respect to the axis of both cylindrical pole piece 27 and hole 33 of pole piece 32. The bobbin 36 and coil 35 thus move with mechanical freedom through the gap formed between the cylindrical pole piece 27 and the hole 33 of pole piece 32.

The wires 38, 39 comprising either end of coil 35 are routed through an insulator 40 to terminals 41, 42. The insulator 40 is fixedly attached to the outer surface of bobbin 36. A small notch 43 is cut in the front pole piece 32 to allow the insulator 40 to clear the front pole piece. This notch does not significantly effect the magnetic field in the gap.

Wires 44, 45 connect respectively terminals 41, 42 to terminals 46, 47. A flexible cable 48 comprising two conductors connects the terminals 46, 47 on carriage assembly 13 to, respectively, terminals 49, 50 fixedly attached to stationary support member 26. The flexible cable 48 is adapted to flex in accordance with any movement of the carriage assembly 13 with complete freedom. The terminals 49, 50 are connected by wires 51, 52 to a control source 53. The control source produces electrical energy which is transmitted over the named wires to provide a current in the coil 35, as will be described hereinafter, to control the operation of the described access mechanism.

Referring to FIGS. 1 through 3, the magnetic fields emitted by the permanent magnets 29, 30 extend from the south pole thereof, through the rear pole piece 31, and into the center pole piece 27. The fields then extend from the center pole piece 27 radially into the gap between the pole piece and the front pole piece 32. The fields close themselves through the front pole piece 32 to the north pole of each of the magnets.

The resultant magnetic field extending radially across the gap between the center pole piece 27 and the front pole piece 32 thus intersects the portion of the coil 35 within the gap in a perpendicular direction. Therefore, energization of the coil by means of a current from control 53 via the described connections interacts with the magnetic field in the gap to produce a substantial force acting on the coil in the axial direction. Whether the force is directed toward or away from the center of the discs 10 depends upon the direction of the current flow through the coil 35.

This force drives the carriage assembly 13 and bobbin 36 in the direction of the force as guided by the carriage base plate 20.

Control 53 operates in accordance with known servo principles to move the array of heads 11 from one set of vertically spaced tracks to another set. A set of vertically spaced tracks having the same radius and being vertically aligned constitutes a "cylinder." Hence, accessing in the embodiment shown constitutes moving the array of heads 11 from cylinder to cylinder.

In accordance with known servo principles such accessing is accomplished by first supplying a current which will produce a force in the desired direction which thereby accelerates the carriage assembly, also in the desired direction. Before the array of transducers 11 reach the desired cylinder, control 53 reverses the direction of the current in the coil 35. This reversal exerts a force on the coil in the reverse direction. This force decelerates the carriage assembly 13 which continues in the desired direction, but at a continually decreasing speed, until coming to rest at the desired cylinder.

The arrangement of the winding of coil 35 may be made so that a constant force is generated for a constant current supply to the coil regardless of the axial position of the coil. The method of designing such a coil is explained in IBM Technical Disclosure Bulletin, Vol. 7, No. 7, pages 640—1, Dec. 1964 entitled "Varied Pitch, Force Compensating Voice coil," by C. H. Kalthoff.

The primary advantage of the disclosed accessing mechanism is that the placement of the permanent magnets 29, 30 as separate magnets spaced from the center pole piece 27 as opposed to an annular magnet totally surrounding the center pole piece allows the flow of air between the magnets and the center pole piece to thereby dissipate thermal energy generated by the coil 35. In the embodiment shown, the airflow may be either by means of convection through the opening 34 in the support member 26 and in base plate 25 and between the permanent magnets 29, 30 and the coil 35. Likewise, enhanced cooling may be attained by the forced flow of air through the described openings. However, sufficient cooling has been attained without the need for forced airflow.

The arrangement of the invention described above also gives the most force for a given coil diameter, therefore allowing the inductance and the weight of the coil 35 to be relatively low. The reduced weight additionally allows the total mass to be moved by the coil to be reduced.

These advantages taken together result in an accessing mechanism employing low weight and high force to thereby provide extremely fast track to track access times.

No specific means for holding the assembly at a selected point is described. In the embodiment shown, the magnetic forces are adequate for holding the assembly in most instances. However, to make the unit resistant to shock, either a mechanical detenting mechanism or a track-following servo system may be employed.

Another advantage of the present invention is that the amount of magnet material is not limited or controlled by the size of the coil. The subject design also allows a long total stroke length having an essentially constant force. The long stroke allows the described accessing mechanism to also be employed for withdrawing the transducers 11 completely out of the array of discs 10. Such removal of the transducers allows the discs 10 to be replaced when desired. In modern disc files, this replacement feature is very important in allowing the use of replaceable disc packs. Such disc packs are presently in use in a number of commercially available disc files.

The specific means for unloading the transducers 11 from the disc 10 upon removal from the array of discs or loading the heads onto the discs 10 upon insertion into the disc area form no part of this invention. Therefore, any known means may be employed.

While the invention has been particularly shown and described with reference to a preferred embodiment thereof, it will be understood by those skilled in the art that various changes in form and details may be made therein without departing from the spirit and scope of the invention.

We claim:

1. Apparatus for converting electrical energy into linear mechanical motion comprising:

a plurality of magnetic means, each said magnetic means having a north and south pole, each said magnetic means creating a magnetic field;

a first pole piece for forming a magnetic flux path from magnetically similar poles of a first polarity of said plurality of magnetic means, said first pole piece terminating in an extended portion, said extended portion being of substantially uniform cross section throughout the length of a substantially uniform nonmagnetic gap, said uniform cross section area being of substantial cylindrical shape having an axis;

said plurality of magnetic means being generally parallel to said axis of said uniform cross section area of said extended portion of said first pole piece and said plurality of magnetic means being spaced apart from said extended portion of said first pole piece to prevent substantial flux leakage therebetween;

a second pole piece for forming a magnetic flux path from magnetically similar poles of the opposite polarity of said plurality of magnetic means, a portion of said second pole piece being arranged to surround said uniform cross section area of said extended portion of said first pole piece to form said nonmagnetic gap therebetween, whereby the lines of flux generated by said plurality of magnetic means are directed by said first and second pole pieces to extend across said nonmagnetic gap;

an electric coil so wound as to substantially conform to said nonmagnetic gap and arranged to be movable within said nonmagnetic gap and to extend completely around said extended portion of said first pole piece within said nonmagnetic gap, whereby application of electric current through said electric coil generates a force thereon at said nonmagnetic gap tending to move said coil along said nonmagnetic gap;

said plurality of magnetic means, said first pole piece, and said second pole piece forming a channel structure for ventilating the portion of said electric coil within said channel structure.

2. The apparatus of claim 1 wherein said channel structure directs the flow of colling medium in a direction perpendicular to said axis of said extended portion of said first pole piece.

3. The apparatus of claim 1 further comprising:

a carriage means arranged to be movable along a predetermined path, said predetermined path being approximately aligned in one plane with respect to said axis of said extended portion of said first pole piece, said carriage means being arranged to support said electric coil within said nonmagnetic gap so that the axis of said electric coil is approximately coextensive with said axis of said uniform cross-sectional area of said extended portion of said first pole piece, whereby application of electric current through said coil generates a force thereon at said nonmagnetic gap tending to move said coil along said axis of said electric coil and thereby tending to move said carriage means along said predetermined path.